(12) United States Patent
Seidel

(10) Patent No.: US 7,877,457 B2
(45) Date of Patent: Jan. 25, 2011

(54) PEER TO PEER GATEWAY

(75) Inventor: Craig Howard Seidel, Palo Alto, CA (US)

(73) Assignee: Macrovision Corporation, Santa Clara, CA (US)

( * ) Notice: Subject to any disclaimer, the term of this patent is extended or adjusted under 35 U.S.C. 154(b) by 326 days.

(21) Appl. No.: 11/384,238

(22) Filed: Mar. 17, 2006

(65) Prior Publication Data

US 2007/0220160 A1 Sep. 20, 2007

(51) Int. Cl.
*G06F 15/167* (2006.01)
*G06F 15/16* (2006.01)

(52) U.S. Cl. ...................................... 709/213; 709/218

(58) Field of Classification Search ................ 709/200, 709/202, 213
See application file for complete search history.

(56) References Cited

U.S. PATENT DOCUMENTS

| | | | | |
|---|---|---|---|---|
| 5,737,526 | A * | 4/1998 | Periasamy et al. | 709/241 |
| 7,395,536 | B2 * | 7/2008 | Verbeke et al. | 718/100 |
| 7,499,980 | B2 * | 3/2009 | Gusler et al. | 709/214 |
| 2002/0143855 | A1 * | 10/2002 | Traversat et al. | 709/202 |
| 2002/0143944 | A1 * | 10/2002 | Traversat et al. | 709/225 |
| 2003/0067912 | A1 * | 4/2003 | Mead et al. | 370/389 |
| 2003/0088544 | A1 * | 5/2003 | Kan et al. | 707/3 |
| 2003/0126120 | A1 * | 7/2003 | Faybishenko et al. | 707/3 |
| 2004/0148434 | A1 * | 7/2004 | Matsubara et al. | 709/246 |
| 2005/0021617 | A1 * | 1/2005 | Rusitschka | 709/204 |
| 2005/0086300 | A1 * | 4/2005 | Yeager et al. | 709/204 |
| 2006/0168225 | A1 * | 7/2006 | Gunning et al. | 709/226 |
| 2006/0187900 | A1 * | 8/2006 | Akbar | 370/352 |
| 2006/0239275 | A1 * | 10/2006 | Zlateff et al. | 370/400 |
| 2008/0028055 | A1 * | 1/2008 | Dolev et al. | 709/222 |
| 2008/0313317 | A1 * | 12/2008 | Berger et al. | 709/223 |

FOREIGN PATENT DOCUMENTS

WO WO 2004/073281 A2 8/2004

OTHER PUBLICATIONS

Scrutiny from Envisional; Democracy: Open Source Video Viewer Co-Opted for Pirated Television; Feb. 24, 2006.
PCT US2007/064192, Macrovision Corporation.—PCT Search Report and Written Opinion, Jun. 20, 2008.
A Peer-to-Peer Filesharing Networks Interconnection System, J.L. Mauri et al, 6 pgs.
A P2P architecture to join supernodes from partially decentralized networks, Jaime Lloret, et al., Dept of Communications, Polytechnic University of Valencia, 18 pgs.
Integrating Peer-to-Peer Neetworking and Computing in the AgentScape Framework, Overeinder et al., Universiteit Amerstdan de Boelelaan, The Netherlands, 8 pgs.
A Survey and Comparison of Peer-to-Peer Overlay Network Schemes, IEEE Communs. Survey & Tutorials, $2^{nd}$ qtr. 2005, vol. 7, No. 2, pp. 72-93.
PCT US2007/064192, Macrovision Corporation.—EP Search Report and Written Opinion, Nov. 3, 2010.

* cited by examiner

*Primary Examiner*—Kenny S Lin
*Assistant Examiner*—Gerald Smarth
(74) *Attorney, Agent, or Firm*—Orrick Herrington & Sutcliffe LLP

(57) ABSTRACT

A method and system for interconnecting a number of peer to peer networks is disclosed. According to one embodiment, a peer to peer gateway communicates with one or more peer to peer networks. The gateway communicates with these networks through the Internet, to which it is connected. The gateway may be configured to perform a number of functions on each of the connected networks, including but not limited to: data storage, searching, data transfer, and data translation.

18 Claims, 8 Drawing Sheets

United States Patent US 7,877,457 B2

PEER TO PEER GATEWAY

FIELD OF THE INVENTION

The field of the invention relates generally to computer systems and more particularly relates to a method and system for communication between peer to peer networks.

BACKGROUND OF THE INVENTION

The Internet is composed of a large number of smaller, interconnected networks. Each of these networks potentially connects a large number of systems to the Internet. These systems may be personal computers, servers, or other devices with internet compatibility.

There are a number of different networks that use the infrastructure of the Internet: internets, intranets, darknets, peer to peer networks, etc. Internets are generally public access networks, freely accessible by anyone with access to the Internet. Intranets are restricted access networks, allowing only a pre-specified group of users access to the information therein. Darknets are a category of network that allow communication between users without allowing others to access the content being communicated.

The most common relationship on the Internet is the client-server relationship. In this arrangement, a number of servers store and maintain information that is accessible by clients. Users obtain access to the Internet and access those servers, communicating either by upload (sending information to a server) or download (receiving information from a server). An alternative arrangement is a peer to peer network. Peer to peer networks (i.e. client to client networks) rely on the individual client systems connected to the internet for storage and transfer, rather than servers. The term "peer to peer" describes the nature of such a network, a network in which every user contributes both to the storage/transfer of information as well as the retrieval of information. Users in a peer to peer network typically originate at an equal level with other users, but may organize themselves into a hierarchical arrangement. Different arrangements may be formed for different functions, i.e. when a network is used for searching the users may take one form of hierarchy, likewise when a network is used for data transfer. Regardless of the structure, users in a peer to peer network communicate directly with each other rather than communicating through an intermediary server.

There are a number of different peer to peer networks. Some are built on Internets, some are built on darknets, and yet others are built on intranets. Because of the proliferation of these networks, there are a number of different protocols for communication between users in a peer to peer network. To access any of these networks, a user needs to understand the protocol of that particular network.

SUMMARY

A method and system for interconnecting a number of peer to peer networks is disclosed. A peer to peer gateway communicates with each network, providing a user with a homogenous environment with which to access each of the interconnected networks. The gateway connects to the Internet and uses that infrastructure to communicate with the peer to peer networks to which it is connected. The gateway may be configured to perform a number of functions, including but not limited to: data storage, searching, data transfer, and data translation.

DETAILED DESCRIPTION

A method and system for interconnecting a number of peer to peer networks is disclosed. A peer to peer gateway communicates with each network, providing a user with a homogenous environment with which to access each of the interconnected networks. The gateway connects to the Internet and uses that infrastructure to communicate with the peer to peer networks to which it is connected. The gateway may be configured to perform a number of functions, including but not limited to: data storage, searching, data transfer, and data translation.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to: floppy disks, optical disks, CD-ROMs, and magnetic-optical disks, read-only memories (ROMs), random access memories (RAMs), EPROMs, EEPROMs, magnetic or optical cards, or any other type of media suitable for storing electronic instructions and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below.

Figure 1:
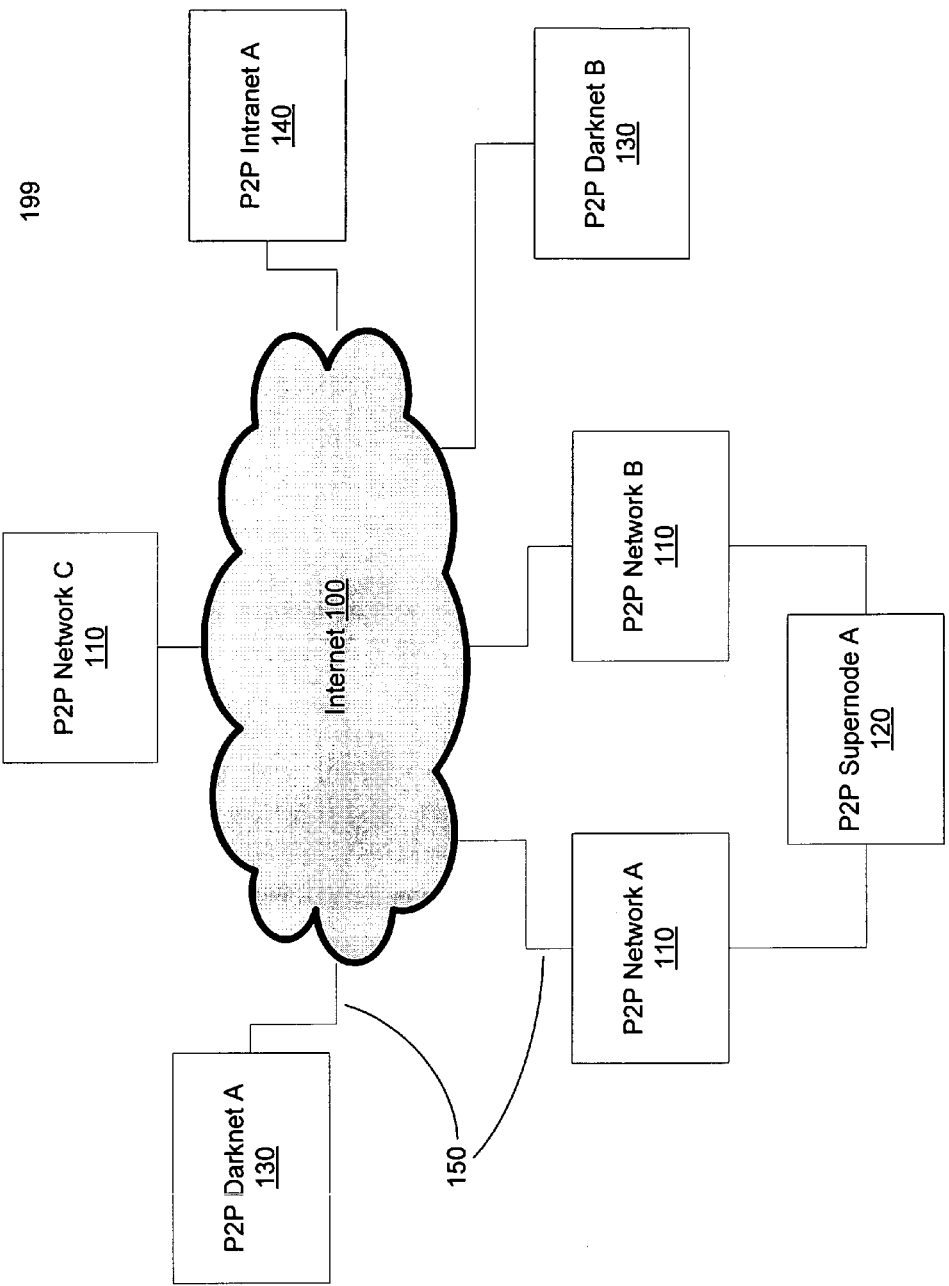
FIG. 1 illustrates a block diagram of prior art Internet topography.

FIG. 1 illustrates a block diagram of prior art Internet topography 199. Network 199 includes a number of peer to peer networks 110, which may connect a number of users to the Internet 100. Network 199 further includes supernode 120, which may be a system connected to the network 199 that was once a peer with a significant amount of data. Because of its data, the peer may have been promoted to the higher status of a supernode 120, such that it is accessed with higher priority by searching users. The supernode 120 is not a server in the typical client/server relationship, but acts like a server in this embodiment. Any peer has the potential to become a supernode 120. Further shown in network 199 are darknets 130, which may connect a number of users to each other without being detected by the rest of the network 199. Finally, intranet 140 is shown, which may be a private network limiting access to a pre-determined list of users. Peer to peer networks 110, supernode 120, darknets 130, and intranet 140 are each connected to the Internet 100 through a network connection 150, such as Ethernet or 802.11 wireless (WIFI). Although FIG. 1 depicts every network as a peer to peer network, non-peer to peer networks could also be connected to the Internet.

Figure 2:
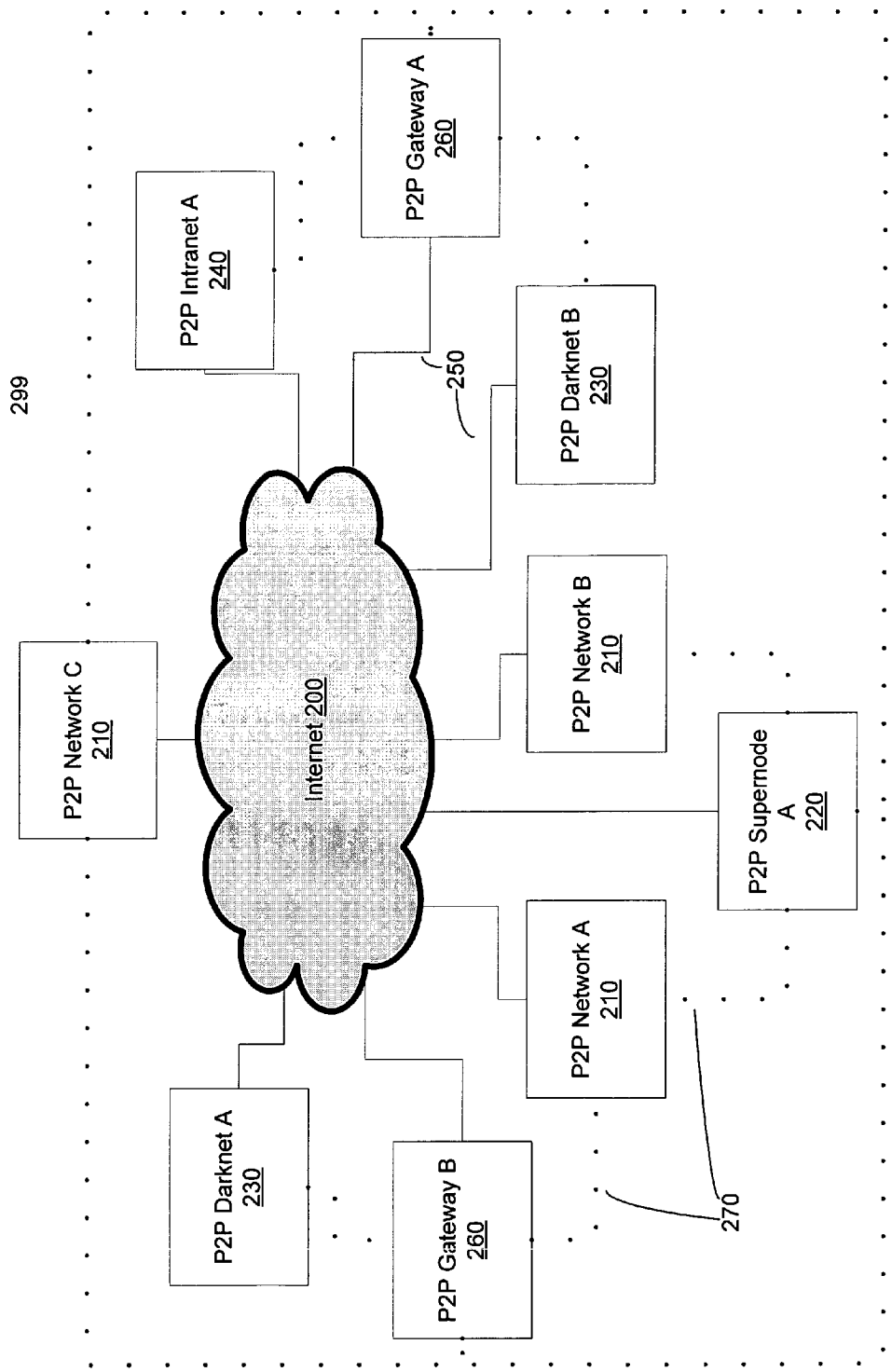
FIG. 2 illustrates a block diagram of exemplary networks interconnected by peer to peer gateways, according to one embodiment of the present invention.

FIG. 2 illustrates a block diagram of exemplary networks interconnected by peer to peer gateways 260, according to one embodiment of the present invention. Network 299 includes a number of networks, including: peer to peer networks 210, supernode 220, darknets 230, and intranet 240. Each of these networks is connected to the Internet 200 through a network connection 250, such as Ethernet or WIFI. FIG. 2 illustrates peer to peer gateways 260 that connect to the Internet 200 through a network connection 250, and virtually connects to one or more networks 210, 220, 230, 240 and/or other gateways 260 via network connections 270.

Network connections 270 are virtual connections, as illustrated by dashed lines. Virtual network connections 270 are not point to point connections, but rather use the infrastructure of the Internet 200 to connect two or more devices. In one embodiment, the networks 210, 220, 230, 240 connecting over a virtual network connection 270 directly address each other to open a communication link.

Each peer to peer gateway 260 performs the act of communicating between two or more peer to peer networks 210, 220, 230, 240. The gateway 260 incurs all the processing overhead associated with talking to each individual network 210, 220, 230, 240. When a user seeks to access one or more individual networks 210, 220, 230, 240, they need to interface only with gateway 260 which performs the desired tasks with each of the networks 210, 220, 230, 240. The gateway 260 provides a seamless interface for a user to interact with one or more peer to peer networks through one point of contact, a single gateway 260. The gateway 260 may support any or all of the following functions for each of the networks that it is connected to: data storage, searching, data transfer or translation.

Data Storage

A peer to peer gateway 260 may store data, including music, videos, files, meta-data, etc. In one embodiment, a peer to peer gateway 260 is dedicated to a particular topic such as music, generally or to a particular music group. That gateway 260 might store data or meta-data related to music or to a music group. When a user seeks access to information through that gateway 260, bandwidth is decreased because the gateway 260 merely needs to provide data to the user, rather than first attaining the data from a network. Meta-data is information about a particular file that describes the file, such as file type, artist, length, size, location, etc. This may be useful when searching for files. For example, the actual file may be stored remotely, and a user may search the meta-data on the local system to locate a file. When the user finds a file, by searching the meta-data, a transfer may be initiated.

Searching

A peer to peer gateway 260 may support search functionality when a user searches for data on network 299 to which the peer to peer gateway 260 is connected to. Once a user submits a request and the request is forwarded to peer to peer gateway 260, gateway 260 may provide the user directly with any data stored within the peer to peer gateway 260. Alternatively, gateway 260 may have the ability to search all the networks (i.e. 210, 220, 230, 240) it is connected to and provide the results to the user. These results might be in the form of a list of documents or they might be the actual documents themselves.

Data Transfer

A gateway 260 may transfer data between two networks (from a source network to a destination network) or between a network and a user. By means of example, suppose a user connected to peer to peer network C 210 requests data that is available on peer to peer network A 210. In one embodiment, data is first transferred from its source in peer to peer network A 210 to peer to peer gateway B 260. The peer to peer gateway B 260 stores and transfers the data to the user connected to peer to peer network C 210. In another embodiment, data is transferred directly from the source peer to peer network C 210 to the destination peer to peer network A 210. This may be done by transferring individual bits or blocks of data, or by any other transfer method as is well known in the art.

Another important feature of the peer to peer gateway 260 is hashing. A file may be hashed according to an algorithm such as: MD4, SHA-1, etc. According to such hashing algorithms, the gateway 260 compares the hash of the retrieved file with the hash of the expected file and determines whether the gateway 260 has received the appropriate file. When transferring data across two different types of networks, the gateway 260 would generate a new hash in the format required by the destination network or networks.

Data Translation

Because different networks may use different communication protocols, transferring data is not always a matter of merely copying data. To fully communicate with all connected networks, gateway 260 performs data translation of content format and file structure; Examples of data formats that may require translation include: MP3, AAC, ZIP or RAR format. Files may be packaged in parts, and the gateway 260 may perform the function of aggregating the parts into a single file or splitting a single file into multiple parts.

Figure 3:
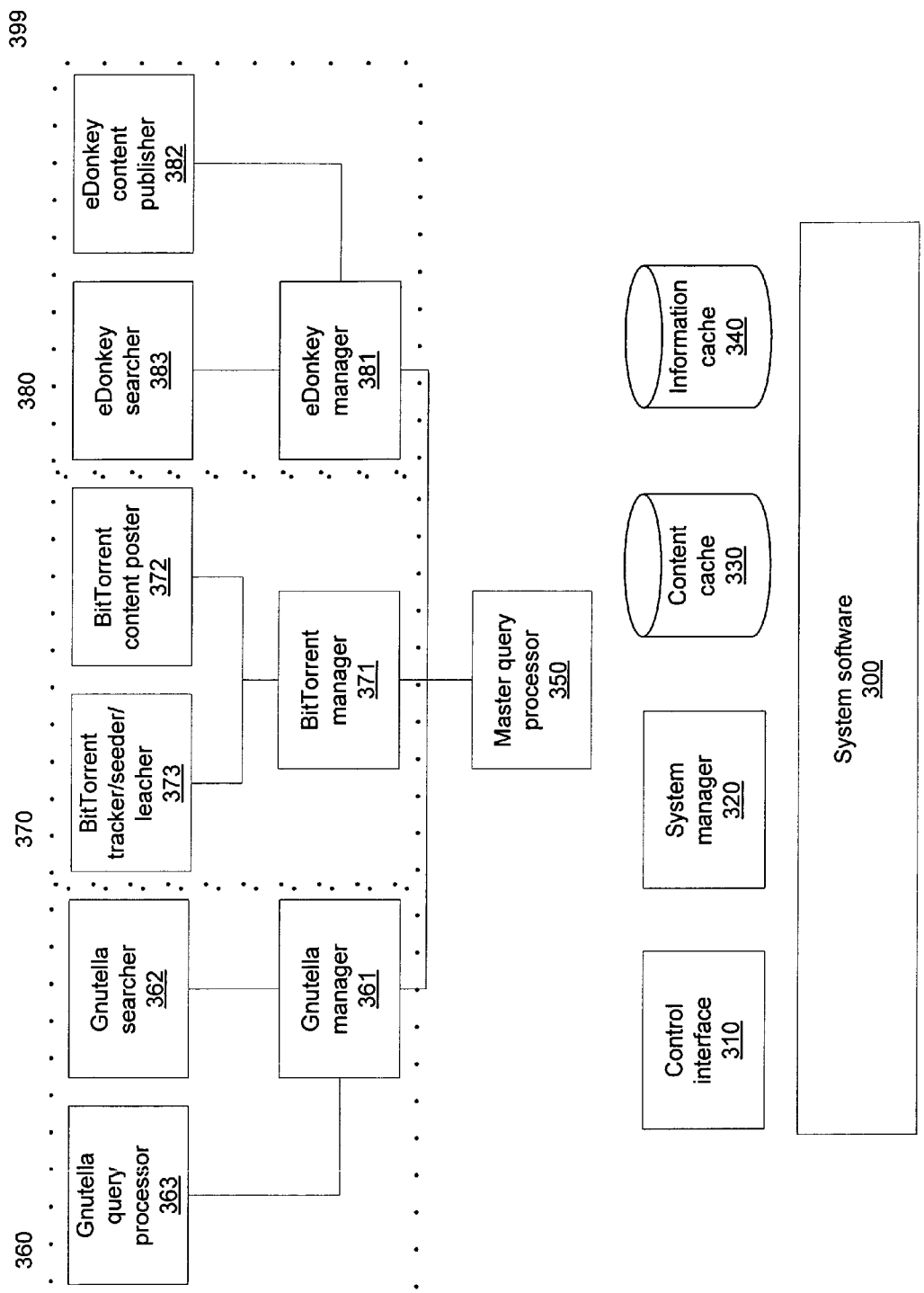
FIG. 3 illustrates a block diagram of exemplary software functions performed by a peer to peer gateway, according to one embodiment of the present invention.

FIG. 3 illustrates a block diagram of exemplary software functions performed by a peer to peer gateway, according to one embodiment of the present invention. Software 399 sufficient to carry out each of the described functions executes on a peer to peer gateway 260, and may reside in peer to peer gateway 260 or within any other system connected to the network 299. The software 399 provides functionality for three types of peer to peer networks: Gnutella, BitTorrent, and eDonkey. Each of these three peer to peer networks is used as an example, and similar peer to peer protocols may be supported by peer to peer gateway 260.

System software 300 runs the basic functions of the gateway 260, and contains at least boot firmware and an operating system. Control interface 310 controls the operation among the various parts of the gateway 260, communicating with each of those components independently. It may perform such tasks as: defining which queries to process, deciding what information to store in the content cache 330, and prioritizing different networks. Access to the control interface 310 would be from a human directly across the Internet. In one embodiment, a user accesses the control interface 310 through a peer to peer network connected to the gateway 260.

When the gateway 260 is used to search across different networks, queries first pass through the control interface 310. Likewise, results are passed from the network in which they originate, through master query processor 350, and finally to the gateway user. In yet another embodiment, the master query processor 350 may interact with the master query processor 350 in another peer to peer gateway 260, with the purpose of searching across the networks or content caches 330 connected to the second gateway. In this fashion, a number of gateways 260 can be interconnected to search a number of different networks and transfer all the results to the user connected to just one peer to peer gateway 260.

The peer to peer gateway 260 further has a system manager 320, which is software that coordinates the various tasks of the peer to peer gateway 260. This system manager 320 could be software as simple as merely a startup script, or it could be a complete management infrastructure. The gateway 260 contains two storage caches: content cache 330 and information cache 340. Content cache 330 stores actual content, which may be bits of a file, metadata or search history and results. The content cache 330 may be populated manually if the administrator wishes to store certain data within that peer to peer gateway 260, or it may be programmed to store data automatically according to any number of algorithms. In one embodiment, the most recent search results are stored in the content cache 300. In another embodiment, dynamic algorithms determine which data is most interesting to users of the peer to peer gateway 260 based on recent searches and connected networks. The content cache 330 is shown as a functional block within the software 399 of a single peer to peer gateway 260, but it also may be an independent memory structure residing on the network, accessible by a number of gateways 260. Shared storage offers more efficient store-and-forward operations because the peer to peer gateways 260 need not transfer data between them. Rather, the requesting peer to peer gateway 260 immediately accesses the data from the shared data storage 330.

Information cache 340 stores information about various networks connected to the peer to peer gateway 260 in which the information cache 340 resides. Information that may be stored in an information cache 340 includes: what data resides on which networks, an indicator of how reliable a network is based on past performance, and any other information that improves the quality of the information provided by that gateway 260.

Each gateway 260 has a master query processor 350 that handles query requests to route queries to and from the various peer to peer network managers 361,371,381. The master query processor 350 also compiles data provided from the various network managers 361, 371, 381 in response to these queries and prepares that data for output back to the user in the form of lists or files as requested by the user.

The gateway 260 contains one or more interfacing portions 360, 370, 380 to the various networks to which it connects. According to one embodiment, the gateway 260 supports Gnutella 360, BitTorrent 370, and eDonkey 380 protocols. Gnutella 360, BitTorrent 370, and eDonkey 380 each have a network manager 361, 371, 381, respectively, and a number of unique functional components, varied based on what type of network the block handles. The network managers 361, 371, 381 are protocol engines, controllers and state machines for their respective networks. Network managers 361, 371, 381 emulate peer to peer protocols and appear to the peer to peer networks as a network entity such as: a client, server, supernode, etc.

Gnutella block 360 contains Gnutella manager 361, Gnutella searcher 362, and Gnutella query processor 363. Gnutella searcher 362 performs searches across the Gnutella network as part of forwarding queries. Gnutella query processor 363 accepts incoming queries from connected networks and forwards those queries to Master query processor 350.

BitTorrent block 370 includes a BitTorrent manager 371, BitTorrent content poster 372, and BitTorrent tracker/seeder/leacher 373. The BitTorrent content poster 372 posts data in a searchable form. BitTorrent tracker/seeder/leacher has multiple functions: as a tracker/seeder it uploads data to the network, and as a leacher it downloads data from the network.

eDonkey block 380 has an eDonkey manager 381, eDonkey content publisher 382, and eDonkey searcher 383. eDonkey content publisher 382 pushes data to the eDonkey servers. The data that the eDonkey content publisher 382 pushes onto the servers is from the content cache 330. Finally, eDonkey searcher 383 searches the eDonkey network as part of forwarding queries from other network managers 361, 371,381.

Network managers 361, 371, 381 translate data to a common format before communicating with each other through master query processor 350. This translation may be done by the respective managers 361, 371, 381, or it may be done by the master query processor 350. This translation may convert all data to a native protocol of the gateway 260, or selectively translate data to the protocol of one of the networks from which the data comes.

When a source network and a destination network use different hash algorithms or hash different portions of a file, the peer to peer gateway 260 acts as a hashing bridge, according to one embodiment. The source network manager transfers and stores the file in the content cache 330. The destination network manager then hashes the file according to the destination network hashing algorithm. The file is then transferred to the destination network.

The embodiment discussed herein describes network managers 361, 371, 381, each communicating with a single network. In another embodiment, each network manager 361, 371, 381 could communicate with multiple peer to peer networks, as long as each of the peer to peer networks communicates using the same network protocol.

Figure 4:
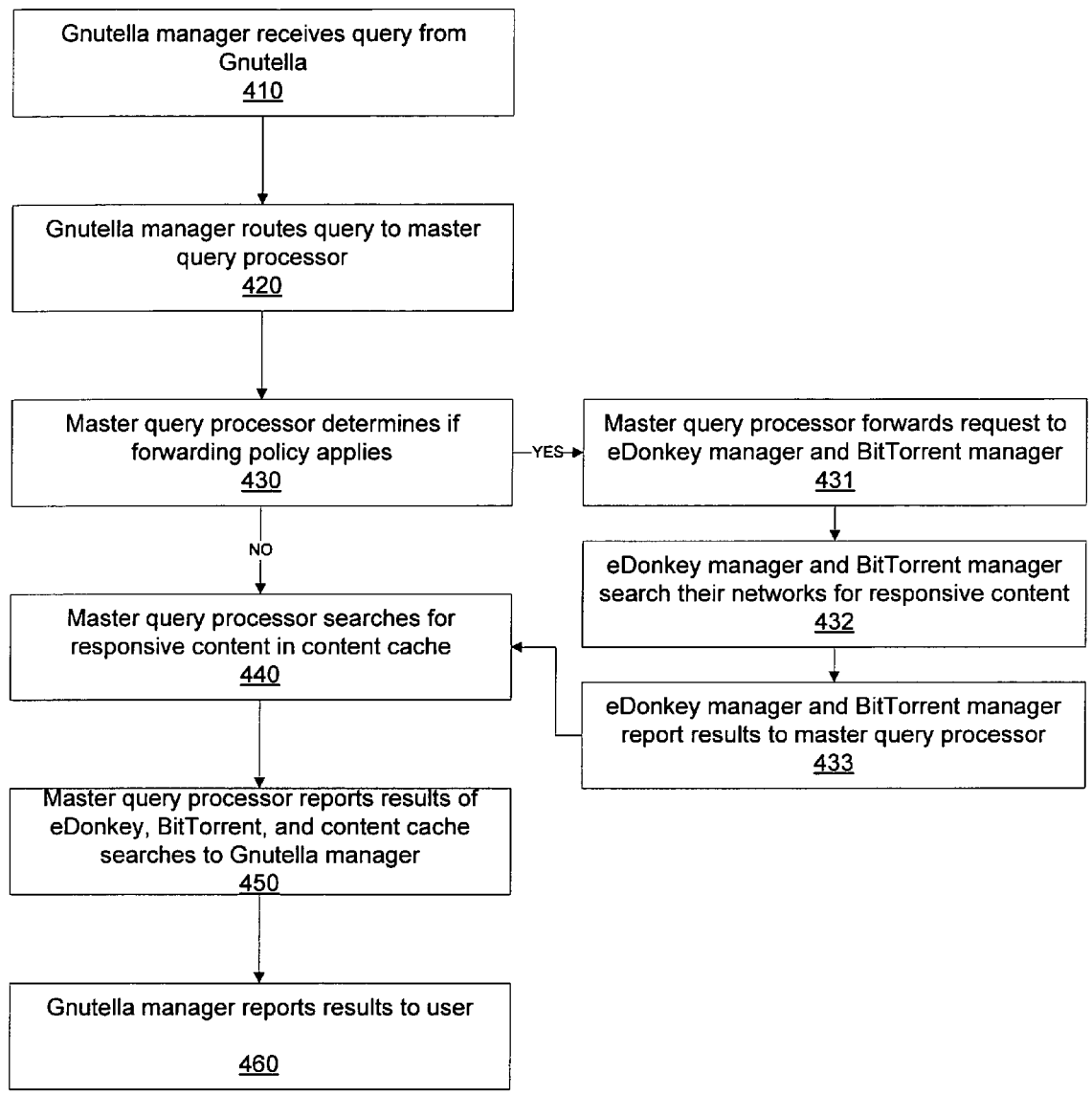
FIG. 4 is a flow chart illustrating an exemplary process for a peer to peer gateway's handling of a query from a Gnutella user, according to one embodiment of the present invention.

FIG. 4 is a flow chart illustrating an exemplary process for a peer to peer gateway's handling of a query from a Gnutella user, according to one embodiment of the present invention. A user's query on the Gnutella network may be forwarded to the Gnutella manager (410). Once received, the query is routed to the master query processor 350 (420). The master query processor 350 then determines if a forwarding policy applies (430) to search one or more of the other peer to peer networks connected to the peer to peer gateway 260. If a policy applies, the master query processor 350 forwards the query to the appropriate network managers, in the example shown the eDonkey manager 381 and BitTorrent manager 371 (431). Each of those networks, eDonkey and BitTorrent, then search their networks for data responsive to the query (432), and report those results to the master query processor 350 (433). If no forwarding policy applies, or once the results have been reported to the master query processor 350 (433), the master query processor 350 searches for data in the content cache 330 that is responsive to the query (440). The master query processor 350 reports the results of each search to the Gnutella manager 361 (450), which then reports the results to the network managers 381, 371, for ultimate reporting back through a peer to peer network and eventually to the requesting user (460).

Once the results are reported back to the user (460), the user may request a data transfer. The peer to peer gateway 260 may handle this request by transferring data directly to the user from the appropriate eDonkey or BitTorrent server through the respective network manager 371, 381. Alternatively, if the data is stored in the content cache 330, the gateway 260 transfers the data to the user from its location in the content cache 330.

Figure 5:
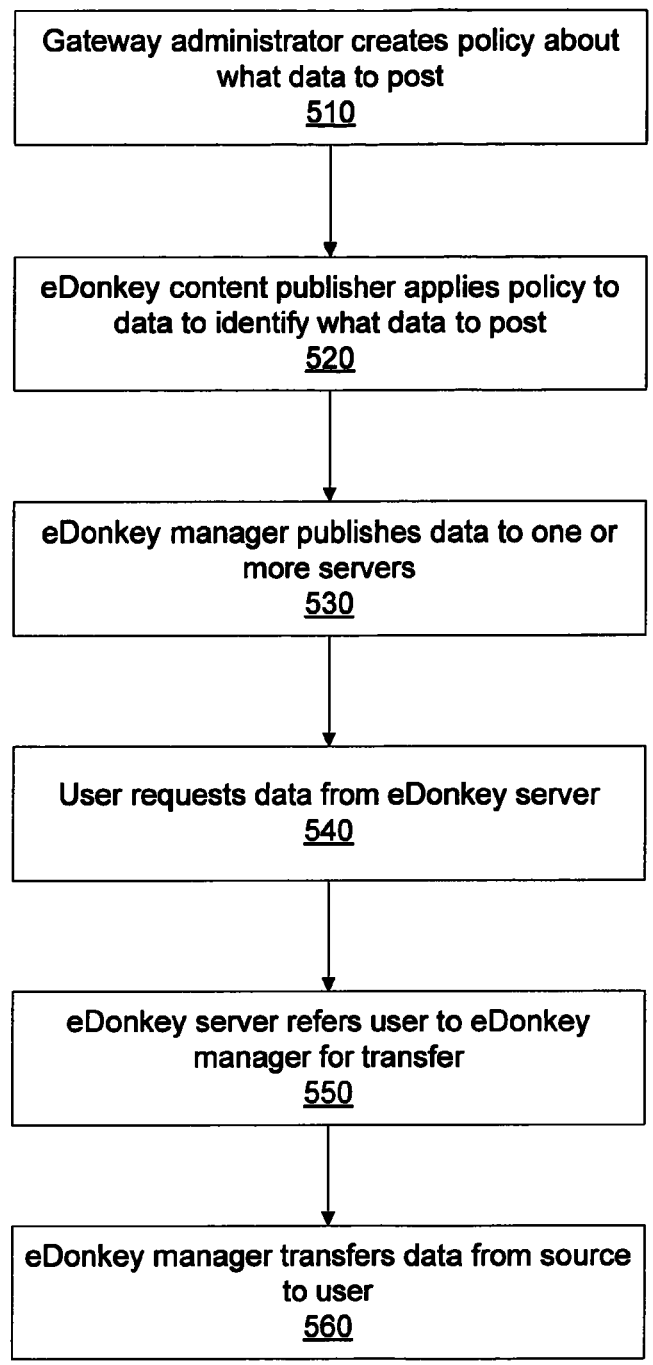
FIG. 5 is a flow chart illustrating an exemplary process for posting data to an eDonkey server and transferring data to a user using a peer to peer gateway, according to one embodiment of the present invention.

FIG. 5 is a flow chart illustrating an exemplary process for posting data to an eDonkey server and transferring data to a user using a peer to peer gateway, according to one embodiment of the present invention. The peer to peer gateway 260 facilitates posting by determining what to publish based on a policy (510). The policy may be to publish everything available, or it may be to publish words indicative of the data, or it may be to publish a fixed set of titles. Any imaginable policy can be created, which allows for great variety in the information posted. Policies may be created based on the content available, or they can be intrinsic to the gateway 260 and act universally.

The eDonkey content publisher 382 then applies the policy to the available data to identify only the data to be published (520). The eDonkey manager 381 then communicates with one or more eDonkey servers to publish the data (530). Once the data is published, a user may request a transfer of that data from the eDonkey server (540). When this occurs, the eDonkey server simply refers the client to the eDonkey manager 381 in the peer to peer gateway 260 (550). The eDonkey manager 381 facilitates the transfer of the data from its source to the user (560).

Figure 6:
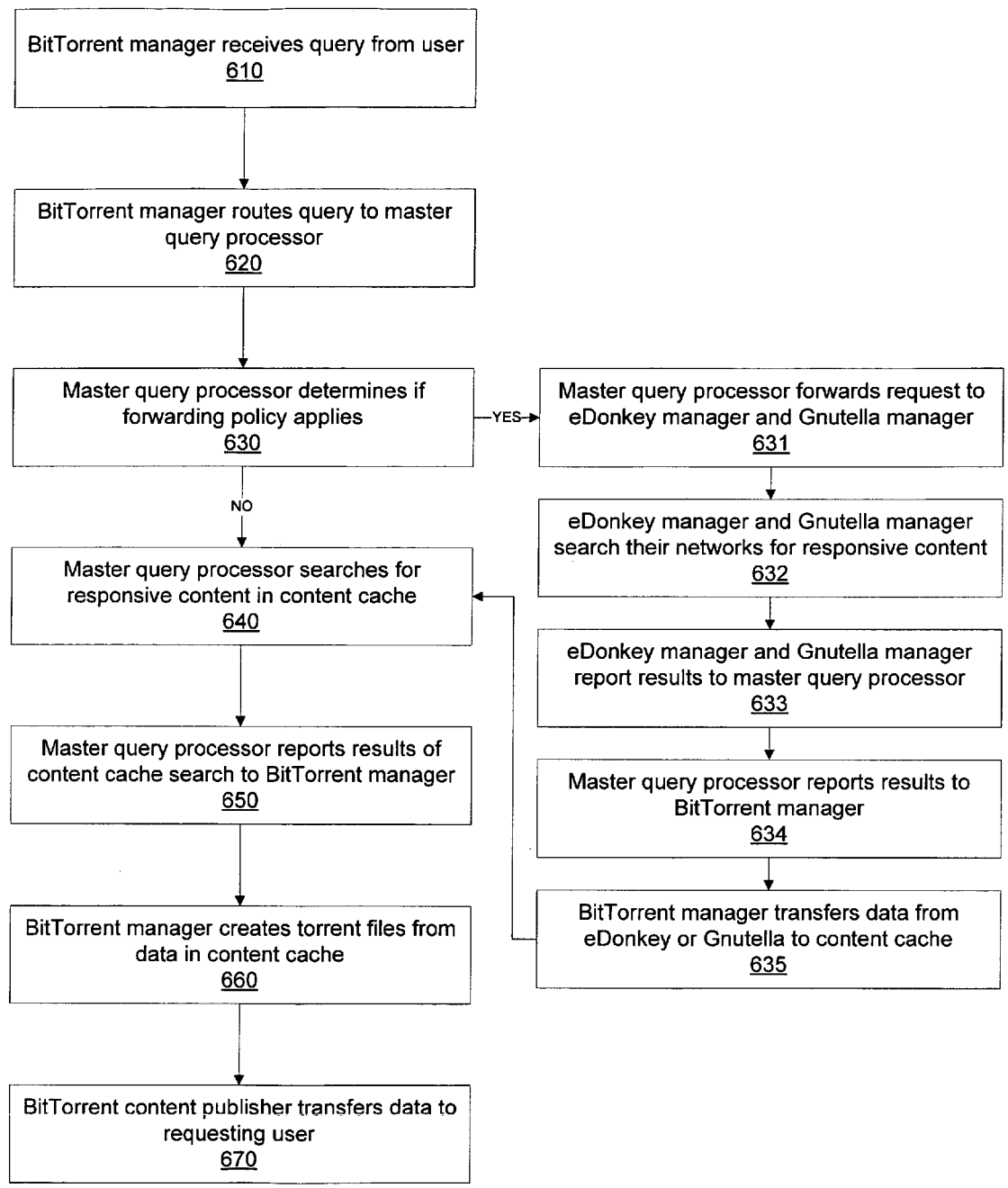
FIG. 6 is a flow chart illustrating an exemplary process for transferring data to a BitTorrent system using a peer to peer gateway, according to one embodiment of the present invention.

FIG. 6 is a flow chart illustrating an exemplary process for transferring data to a BitTorrent system using a peer to peer gateway, according to one embodiment of the present invention. A BitTorrent system may allow a user to directly access data stored on the BitTorrent server. This may be in the form of a website, software, or any other executable program.

If a user requests data (610), the BitTorrent manager 371 routes the query to master query processor 350 (620). The master query processor 350 determines if a forwarding policy applies (630). If so, master query processor 350 forwards the request according to the policy (640). In one embodiment, the policy determines that eDonkey and Gnutella networks will be searched. According to this embodiment, the eDonkey manager 361 and Gnutella manager 381 search their respective networks for data responsive to the user request (631). The managers 361, 381 then report the results of their query to the master query processor 350 (632). The master query processor 350 reports the results of the search to the BitTorrent manager 371 (633), which then transfers the data from the eDonkey and/or Gnutella networks to the content cache 330 (634). If there is no forwarding policy, or once the data is transferred from the networks to the content cache 330 (634), the master query processor 350 searches for responsive data in the content cache 330 (640). Master query processor 350 then reports the results of the content cache search to the BitTorrent manager 371 (650). The BitTorrent manager 371 creates torrent files (660), which the BitTorrent content poster 372 transfers to the requesting user (670).

Searching for files on the BitTorrent network requires that the BitTorrent manager 371 maintain a list of available BitTorrent file sites. Each of these sites, located on systems connected to the Internet 200, may contain a list of torrents of available files. When a user performs a query on the BitTorrent network, the BitTorrent manager 371 searches each list of torrents and responds to the user with responsive information on the file sites. Alternatively, the BitTorrent manager 371 could maintain a cache of torrents.

For transferring data to a user through the BitTorrent network, either the BitTorrent content poster 372 posts a list of the available torrents in the content cache 330 to a site or a user queries the BitTorrent manager 371. If the BitTorrent content poster 372 publishes the available torrents to a site, a user may request a transfer of one of those torrents. That request is forwarded to the BitTorrent manager 371. The BitTorrent manager 371 then coordinates the transfer of torrents from content cache 330 to the requesting user. If a user queried the BitTorrent manager 371, the BitTorrent manager 371 searches the local content cache 330 and responds to the user either with a list of responsive available torrents. If requested by the user, the BitTorrent manager 371 will transfer the torrent from the content cache 330.

For the gateway 260 to make data available on a BitTorrent network, the standard BitTorrent tracker/seeder method must be adhered to. Accordingly, BitTorrent tracker/seeder/leacher 373 performs each of these functions. Consistent with common BitTorrent client actions, once data is distributed the BitTorrent tracker/seeder/leacher 373 could cease seeding data and allow other seeds to provide a source for the data.

Figure 7:
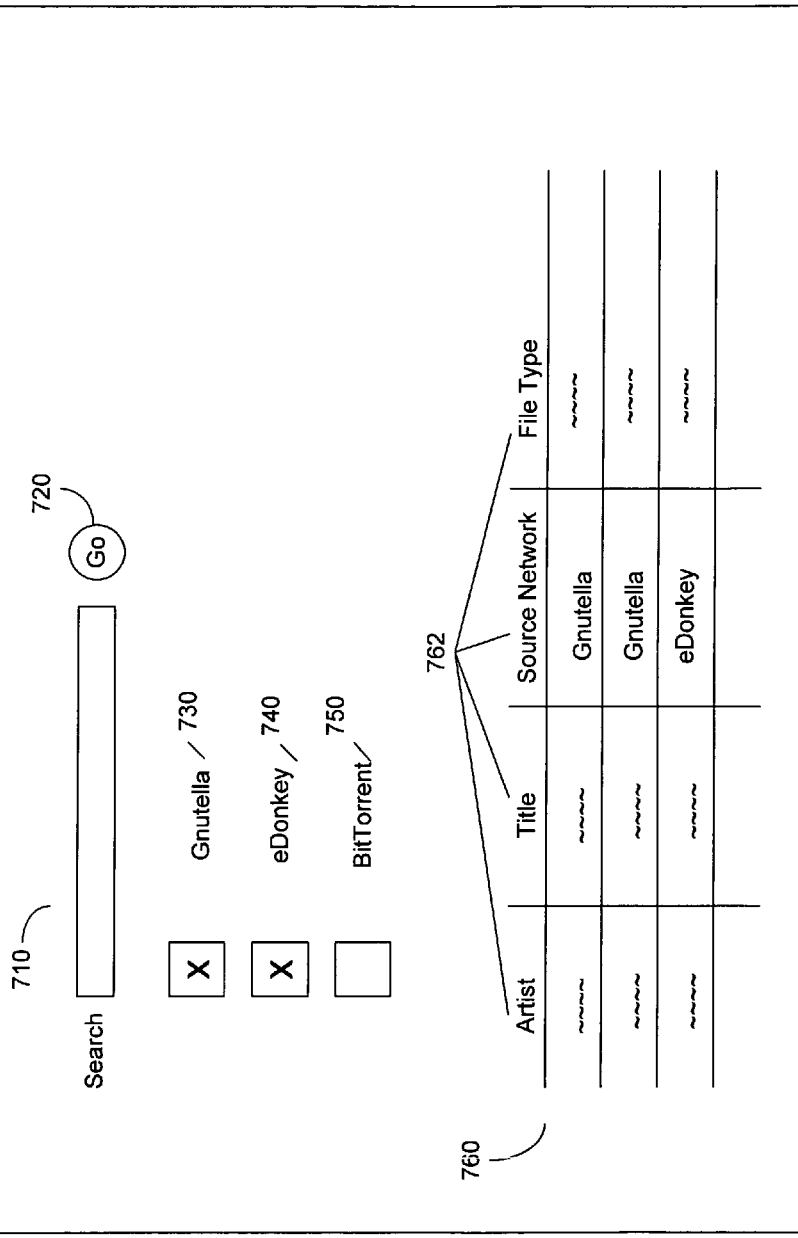
FIG. 7 illustrates an exemplary user interface for a user to interact with multiple peer to peer networks, according to one embodiment of the present invention.

FIG. 7 illustrates an exemplary user interface for a user to interact with multiple peer to peer networks, according to one embodiment of the present invention. A user may access a webpage on the internet 200, or may run software on a computer that connects to the internet 200 that provides the user with the interface shown 700. The interface has search input 710, which allows a user to type in a descriptor of what they are looking for. The user then selects which networks they wish to search, in the embodiment shown the user may select any of Gnutella 730, eDonkey 740 and BitTorrent 750. The user initiates a search by clicking on the "Go" button 720 with their mouse, or by pressing enter. The results of the search are displayed in a table 760. In the embodiment shown the table, the table includes categories 762 for Artist, Title Source Network, File Type, etc. The information in each of these categories 762 comes from the meta-data, such that the entire file is not transferred on initiation of a search, but only the meta-data is displayed to the user.

In one embodiment, peer to peer gateways 260 are dedicated to specific functions and are preferentially placed in the network 200 to minimize the required bandwidth for carrying out those functions. The gateway 260 could co-locate or be directly connected to a number of supernodes 220 and other peer to peer networks 210, 220, 230, 240 that are themselves dedicated to topics in common with the gateway 260. This embodiment reduces bandwidth and overhead when communicating with these systems. By selectively choosing which systems the gateway 260 co-locates with or connects to, the overall bandwidth required by that gateway 260 is reduced.

The peer to peer gateway 260 has been described herein as a stand-alone device, such as a computer or a server, residing on the network 200. However, the peer to peer gateway 260 could also co-locate with another system on the network. In this embodiment, the gateway 260 itself would be in the form of software running on a client or server connected to a network 200. This arrangement would reduce the bandwidth required for communications between the gateway 260 and any networks co-locating with it on the same system. Any number of network devices may also reside on the network, such as load balancers which are used to support scalability and security, or a firewall that is used for security.

A variety of software applications may be run on the gateway computer. The minimum software required is boot firmware and an operating system. An Intel-architecture machine running Microsoft Windows or Linux would be sufficient, but virtually any operating system on virtually any computer would be adequate. The system may also run a Java Virtual Machine to allow development in Java, a web server to provide a user interface for monitoring and control, or a firewall to prevent unauthorized access.

Figure 8:
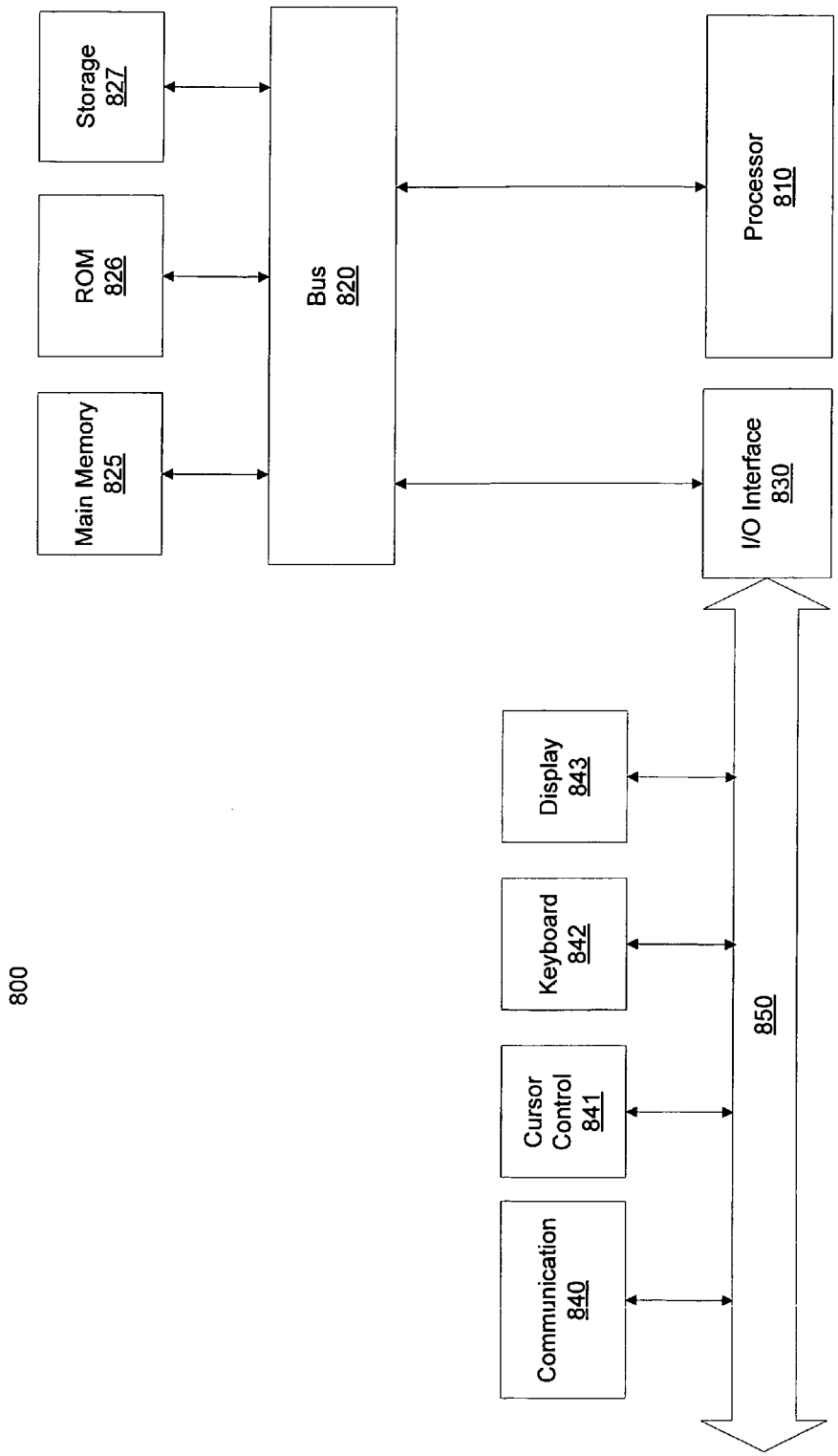
FIG. 8 illustrates an exemplary computer architecture for use with the present system, according to one embodiment of the invention.

FIG. 8 illustrates an exemplary computer architecture for use with the present system, according to one embodiment of the invention. This may be the architecture of any system connected to Internet 200, such as a peer to peer gateway 260, a client system, server system, or any other device connected to Internet 200. One embodiment of architecture 800 comprises a system bus 820 for communicating information, and a processor 810 coupled to bus 820 for processing information. Architecture 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Architecture 800 also may include a read only memory (ROM) and/or other static storage device 826 coupled to bus 820 for storing static information and instructions used by processor 810.

A data storage device 827 such as a magnetic disk or optical disc and its corresponding drive may also be coupled to computer system 800 for storing information and instructions. Architecture 800 can also be coupled to a second I/O bus 850 via an I/O interface 830. A plurality of I/O devices may be coupled to I/O bus 850, including a display device 843, an input device (e.g., an alphanumeric input device 842 and/or a cursor control device 841).

The communication device 840 allows for access to other computers (servers or clients) via a network. The communication device 840 may comprise one or more modems, network interface cards, wireless network interfaces or other well known interface devices, such as those used for coupling to Ethernet, token ring, or other types of networks.

A further advantage of the above embodiment is the highly modular nature of the gateway 260. By dedicating each gateway 260 to a particular purpose, expansion of the network of gateways 260 is easy to implement. For example, suppose a first gateway 260 translates data from peer to peer network A 210 to peer to peer network B 210 and a second gateway 260 translates data from peer to peer network B 210 to peer to peer network C 210. If an additional peer to peer network D was added to the Internet, a single gateway 260 translating data from peer to peer network C 210 to network D would be sufficient to translate data from any of the previous peer to peer networks 210 to the new network D. In this fashion, the interconnection of gateways 260 can be easily expanded to incorporate new networks with the addition of only a single gateway 260.

A method and system for interconnecting a number of peer to peer networks using a peer to peer gateway has been disclosed. Although the present methods and systems have been described with respect to specific examples and subsystems, it will be apparent to those of ordinary skill in the art that the present disclosure is not limited to these specific examples or subsystems but extends to other embodiments as well.

What is claimed is:

1. A method of searching by using a plurality of network managers, the method comprising:
   receiving a search request from a first peer in a first peer to peer network of a plurality of peer to peer networks, the first peer to peer network having a first peer to peer protocol at a first network manager of a gateway, wherein the search request requests content accessible via the plurality of peer to peer networks, and wherein the search request identifies a second peer to peer network and a third peer to peer network to search;
   forwarding the search request to a second network manager of the gateway, wherein the second network manager of the gateway has access to the second peer to peer network of the plurality of peer to peer networks, the second peer to peer network having a second peer to peer protocol;
   forwarding the search request to a third network manager of the gateway, wherein the third network manager of the gateway has access to a third peer to peer network of the plurality of peer to peer networks, the third peer to peer network having a third peer to peer protocol; and
   searching the content in the plurality of the peer to peer networks by using the first network manager, the second network manager, and the third network manager of the gateway.

2. The method of claim 1, further comprising translating the search request into the first peer to peer protocol, the second peer to peer protocol, and the third peer to peer protocol.

3. The method of claim 1 wherein the search request is received from a peer in communication with the gateway.

4. The method of claim 1 wherein searching the content in the plurality of the peer to peer networks further comprises:
   routing the search request to the first peer to peer network, to the second peer to peer network, and to the third peer to peer network.

5. A method of searching content for a plurality of networks, the method comprising:
   accessing a plurality of peer to peer networks responsive to a search request for content, wherein the search request is received at a first network manager of a gateway from a peer in a first peer to peer network having a first peer to peer protocol, and wherein the search request identifies a second peer to peer network and a third peer to peer network to search, and wherein the search request is forwarded to a second network manager of the gateway accessible to the second peer to peer network having a second peer to peer protocol and forwarded to a third network manager of the gateway accessible to the third peer to peer network having a third peer to peer protocol;
   searching the content in each of the first peer to peer network, the second peer to peer network, and the third peer to peer network; and
   transferring the content to the peer by using the gateway.

6. The method of claim 5 wherein the peer is in communication with the first peer to peer network.

7. The method of claim 6 wherein transferring content from the first peer to peer network to a peer comprises:
   transferring the content from the first peer to peer network to the gateway;
   translating the content from the first protocol to the second protocol;
   transferring the content from the gateway to the second peer to peer network; and
   transferring the content from the second peer to peer network to the peer.

8. A method of providing content for a plurality of networks, the method comprising:
   receiving content at a first network manager of a gateway from a source in a plurality of peer topeer networks responsive to a search request for content, wherein the search request is received from a peer in a first peer to peer network having a first peer to peer protocol, and wherein the search request identifies a second peer to peer network and a third peer to peer network to search, and wherein the search request is forwarded to a second network manager accessible to the second peer to peer network having a second peer to peer protocol and forwarded to a third network manager accessible to the third peer to peer network having a third peer to peer protocol;

providing the content to the first peer to peer network by using the first peer to peer protocol;

providing the content to the second peer to peer network by using the second peer to peer protocol; and providing the content to the third peer to peer network by using the third peer to peer protocol.

9. The method of claim 8 further comprising translating the content into the first peer to peer protocol, the second peer to peer protocol, and the third peer to peer protocol.

10. A non-transitory computer-readable medium having stored thereon a plurality of instructions, said plurality of instructions when executed by a computer, cause said computer to perform:

receiving a search request from a first peer in a first peer to peer network of a plurality of peer to peer networks, the first peer to peer network having a first peer to peer protocol at a first network manager of a gateway, wherein the search request requests content accessible via the plurality of peer to peer networks, and wherein the search request identifies a second peer to peer network and a third peer to peer network to search;

forwarding the search request to a second network manager of the gateway, wherein the second network manager of the gateway has access to the second peer to peer network of the plurality of peer to peer networks, the second peer to peer network having a second peer to peer protocol;

forwarding the search request to a third network manager of the gateway, wherein the third network manager of the gateway has access to the third peer to peer network of the plurality of peer to peer networks, the third peer to peer network having a third peer to peer protocol; and searching the content in the plurality of the peer to peer networks by using the first network manager, the second network manager, and the third network manager of the gateway.

11. The computer-readable medium of claim 10, having stored thereon-additional instructions, said additional instructions when executed by a computer, cause said computer to further perform translating the search request into the first peer to peer protocol, the second peer to peer protocol, and the third peer to peer protocol.

12. The computer-readable medium of claim 10 wherein the search request is received from a peer in communication with the gateway.

13. The computer-readable medium of claim 10, having stored thereon-additional instructions, said additional instructions when executed by a computer for searching the content in the plurality of the peer to peer networks, cause said computer to further perform:

routing the search request to the first peer to peer network and to the second peer to peer network and to the third peer to peer network.

14. A non-transitory computer-readable medium having stored thereon a plurality of instructions, said plurality of instructions when executed by a computer, cause said computer to perform:

accessing a plurality of peer to peer networks responsive to a search request for content, wherein the search request is received at a first network manager of a gateway from a peer in a first peer to peer network having a first peer to peer protocol, and wherein the search request identifies a second peer to peer network and a third peer to peer network to search, and wherein the search request is forwarded to a second network manager of the gateway accessible to the second peer to peer network having a second peer to peer protocol and forwarded to a third network manager of the gateway accessible to the third peer to peer network having a third peer to peer protocol;

searching the content in each of the first peer to peer network, the second peer to peer network, and the third peer to peer network; and transferring the content to the peer using the gateway.

15. The computer-readable medium of claim 14 wherein the peer is in communication with the first peer to peer network.

16. The computer-readable medium of claim 15, having stored thereon-additional instructions, said additional instructions when executed by a computer, cause said computer to further perform transferring content from the first peer to peer network to a peer comprises:

transferring the content from the first peer to peer network to the gateway;

translating the content from the first protocol to the second protocol;

transferring the content from the gateway to the second peer to peer network; and transferring the content from the second peer to peer network to the peer.

17. A non-transitory computer-readable medium having stored thereon a plurality of instructions, said plurality of instructions when executed by a computer, cause said computer to perform:

receiving content at a first network manager of a gateway from a source in a plurality of peer to peer networks responsive to a search request for content, wherein the search request is received from a peer in a first peer to peer network having a first peer to peer protocol, and wherein the search request identifies a second peer to peer network and a third peer to peer network to search, and wherein the search request is forwarded to a second network manager accessible to the second peer to peer network having a second peer to peer protocol and forwarded to a third network manager accessible to the third peer to peer network having a third peer to peer protocol;

providing the content to the first peer to peer network by using the first peer to peer protocol; providing the content to the second peer to peer network by using the second peer to peer protocol; and providing the content to the third peer to peer network by using the third peer to peer protocol.

18. The computer-readable medium of claim 17, having stored thereon-additional instructions, said additional instructions when executed by a computer, cause said computer to further perform translating the content into the first peer to peer protocol, the second peer to peer protocol, and the third peer to peer protocol.

* * * * *